Feb. 18, 1958
H. R. ARVE ET AL
2,823,495
GRINDER ATTACHMENT FOR VEHICLES
Filed March 22, 1956
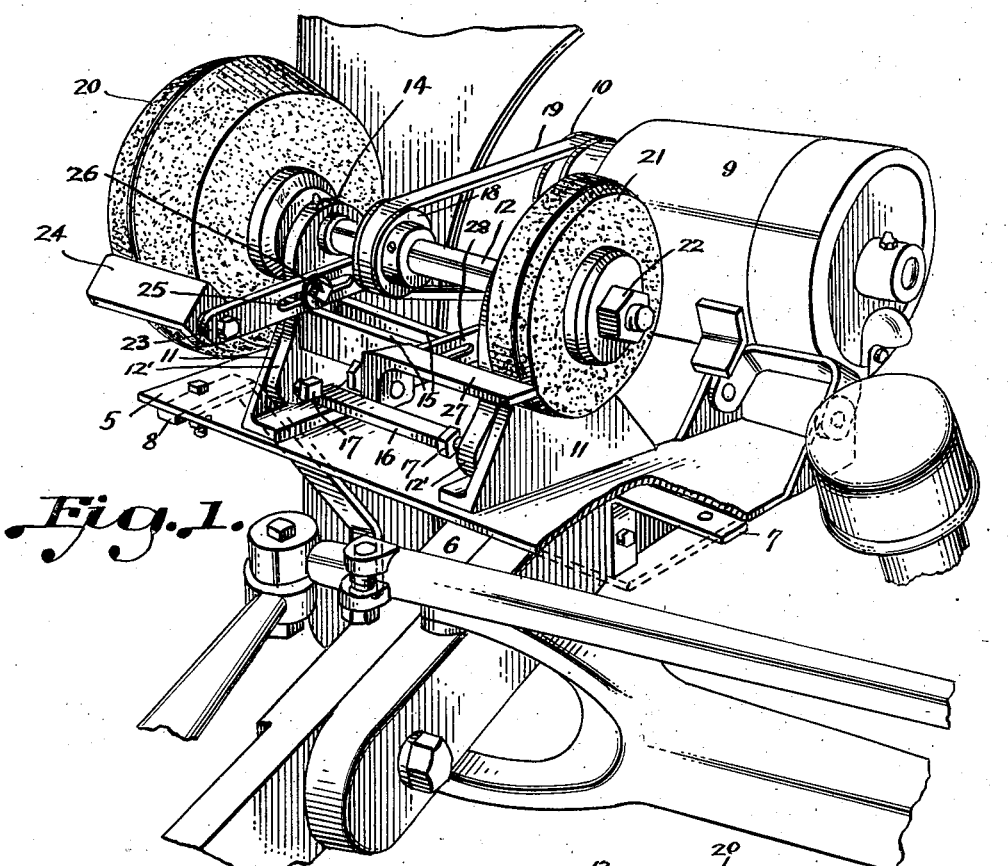
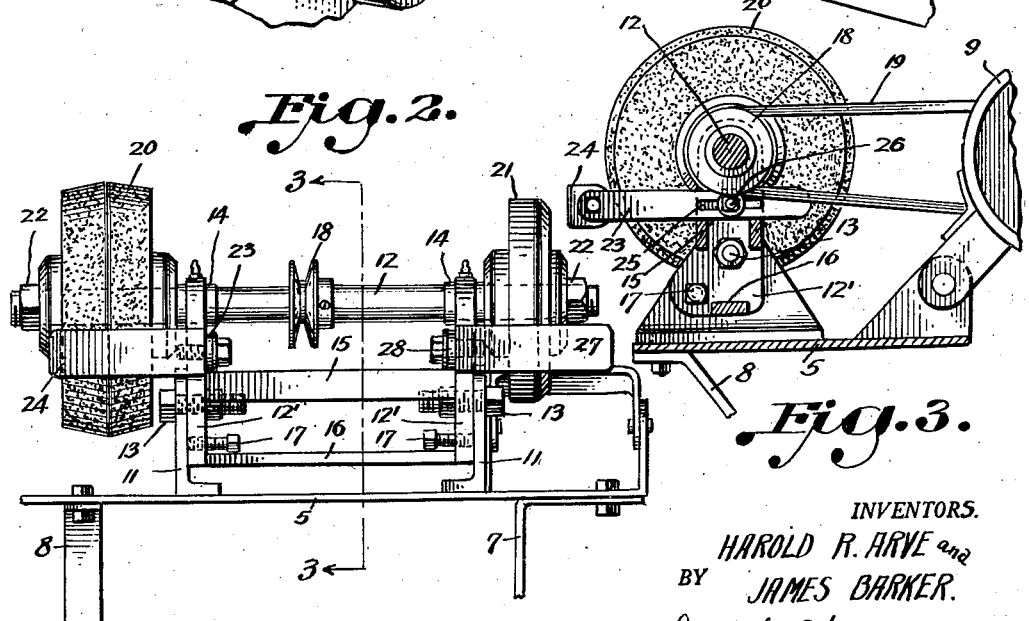
INVENTORS.
HAROLD R. ARVE and
BY  JAMES BARKER.
ATTY.

United States Patent Office 2,823,495
Patented Feb. 18, 1958

2,823,495

GRINDER ATTACHMENT FOR VEHICLES

Harold R. Arve and James Barker, Homestead, Fla.

Application March 22, 1956, Serial No. 573,141

4 Claims. (Cl. 51—166)

This invention is an attachment for use particularly in connection with motor vehicles, the invention residing in means of simple and inexpensive construction to be readily applied to a tractor, truck or other automotive equipment to derive from the latter the power necessary to operate the grinding machinery.

The primary purpose of the invention is to provide an attachment of the character generally stated which may be quickly and easily applied to various types of trucks and other motor vehicles in position to obtain its power from the power source of the vehicle, which may be readily applied to the automotive equipment and which may be readily swung and firmly maintained in either operative or inoperative positions as desired.

A further object of the invention is to provide a grinding attachment which includes two or more grinding, abrading or buffer wheels, which is applied to the automotive equipment in such position as to enable the attachment to be readily accessible when grinding, sharpening or buffing operations are required, which remains a permanent part of the automotive equipment, and which in no way interferes with or impedes the operation of any other parts of the automotive equipment.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawing:

Fig. 1 is a perspective view of a portion of the front end of a tractor or other automotive equipment and illustrating as applied thereto a grinding attachment embodying the invention, Fig. 2 is a front elevation, on a reduced scale, of the attachment as shown in Fig. 1, and Fig. 3 is a transverse sectional view taken substantially on line 3—3 of Fig. 2 and looking in the direction of the arrows.

The invention, as heretofore stated, is primarily adapted for use in connection with automotive equipment such as trucks, tractors, etc., and is to be applied thereto in such manner as not to interfere with or impede the operations or mechanisms of the tractor and which may be retained in position upon the automotive equipment at all times either in operative or inoperative positions.

Referring now more particularly to the drawing, the attachment comprises a substantially rectangular base preferably of metal indicated at 5 to rest near one end upon the frame 6 of the truck or tractor and is secured rigidly in position upon this frame by brackets 7 and 8 near opposite ends of the base. This base, as shown in the drawings, is relatively close to and immediately in front of the generator 9 forming a part of the automotive equipment, which generator is equipped with the usual power pulley indicated at 10.

Rigidly secured to the upper surface of the supporting base 5 and in spaced parallel relationship are supporting standards or brackets indicated at 11. These brackets extend from the forward edge of the supporting base 5 rearwardly toward the rear end of the said base.

Mounted for pivotal swinging movement between these standards is a frame which carries the grinding or buffing wheel supporting shaft 12. This frame comprises plates 12' mounted one adjacent to the inner surface of the standards 11, being pivoted thereto inwardly of their ends as at 13. The upper portion of each of these plates is provided with a bearing 14 in which the shaft 12 rotates. These spaced plates 12' are rigidly connected to one another by the bars or struts 15 near the medial portions of the blades and the bar 16 connecting the bottoms of these plates. Each of the plates is provided with a set screw 17 to bear against the adjacent face of the supporting bracket 11 in order that the plates which form a part of the frame may be rocked upon the pivot 13 and held in desired angular position with respect to the standards 11 by tightening the screws 17. It will be observed that the shaft 12 is mounted in parallelism with the axis of the generator 9. The shaft 12 is equipped with a belt wheel 18 over which a drive belt 19 passes, the said belt also being trained over the pulley 10 secured to the generator shaft.

The shaft 12 may be of any desired length but is preferably sufficiently short to permit the attachment to be confined beneath the hood of the automotive vehicle. Grinding wheels of desired types and diameters 20 and 21 are secured to the ends of the shaft and retained thereon by the clamping nuts indicated at 22. Slidably mounted adjacent one of the plates 12' and resting upon the upper transverse bars 15 is a slide bar 23 which pivotally carries at its forward end a right angularly disposed guide plate 24. This bar 23 is provided with a longitudinal slot 25 to receive a set screw 26 to enable the bar 23 to be adjusted transversely of the axis of the grinding wheel 20 and to be retained in such adjusted position. A support or guide 27 is arranged adjacent to the forward abrasive face of the wheel 21 and is secured to a similar bar 28 capable of adjustment upon the adjacent plate 12' at right angles to the axis of the shaft 12.

In operation, the supporting base 5 is rigidly attached to the frame of the motor vehicle in advance of the generator and in the manner shown and described, the base being so mounted as to maintain the shaft 12 in parallelism with the shaft of the generator 9. When it is desired to use the wheels 20—21 for grinding, sharpening or buffing purposes, the belt 19 is passed over the belt wheel 10 of the generator and over the pulley 18 of the attachment. The frame is swung to such position as to bring about proper tensioning of the belt 19, whereupon the set screws are seated so as to lock the frame so positioned. Operation of the generator operating as a motor will through these means cause the shaft 12 to rotate. The device or devices to be operated upon by the wheels 20—21 are rested upon the guides 24—27. When the usefulness of the grinder attachment is at an end, the set screws 17 are loosened so that the frame may be swung rearwardly upon its pivots 13, whereupon the belt 19 is detached from the generator pulley 10 and the grinding mechanism is in its retracted or out of the way position. This attachment is of sufficient size to enable it to be readily accommodated beneath the hood of the vehicle with which it is attached without interference with any of the normal mechanisms or appurtenances carried by the vehicle.

We claim:

1. In a grinding machine, a base, supporting standards rising in spaced parallelism from said base, a plate pivoted inwardly from its ends to each of said standards upon adjacent sides thereof, tie bars disposed between said plates and rigidly connected at their ends to the latter, a shaft rotatably mounted between said plates and carried near one end of the latter, set screws passing through said plates near the opposite ends thereof to bear against said standards to hold the plates and shaft in any desired pivotal adjusted position in relation to the base, grinding wheels affixed to said shaft, and a belt pulley on said shaft to receive a power belt.

2. In a grinding machine, a base, supporting standards rising in spaced parallelism from said base, a pair of plates each pivoted inwardly from its ends upon the inner faces of said standards, spaced parallel cross bars connecting said plates rigidly together, a shaft rotatably mounted near its ends in one end each of said plates and above said cross bars, grinding wheels attached to said shaft, set screws passing through each of said plates near its opposite end for engagement with the adjacent standard to hold the plates and shaft in any desired pivotal adjusted position in relation to the base, grinder brackets slidably mounted upon each of said plates and resting upon said cross bars, means for adjusting said brackets toward or away from said grinding wheels, and a belt pulley secured to said shaft.

3. In a grinding machine, a base, spaced parallel standards rising from said base, a pair of plates each pivoted at its mid portion to the inner face of a standard and projecting at one end above said standards, means passing through each plate and engaging the corresponding standard for holding the plates and shaft in desired angular adjustment in relation to the base, a pair of spaced parallel cross bars interposed between said plates above the pivots thereof, a shaft rotatably mounted in the upper ends of said plates, grinding wheels secured to the ends of said shaft beyond said plates, slide bars disposed transversely of said base resting upon said cross bars beneath said shaft and each having a slot disposed longitudinally thereof, set screws threaded in said plates and passing through said slots, support members secured to the ends of said slide bars, and a drive pulley secured to said shaft between said standards.

4. A grinding machine for attachment to the frame of a vehicle, comprising a base, means for supporting the base on said frame, spaced vertical standards rising from said base, a plate pivotally attached to each standard, spaced horizontal parallel cross bars rigidly connecting said plates together, bearings at the upper ends of said plates, a shaft rotatably mounted near its ends in said bearings above the bars, grinding wheels mounted on said shaft, set screws passing through said plates and engaging said standards for holding the plates, cross bars and shaft in any desired angular adjustment in relation to the base, grinder guides slidably mounted upon said plates and resting upon said cross bars, support members secured to the ends of said grinder guides, means for pivotally supporting said grinder guides to the vertical plates, and a belt pulley mounted on said shaft to receive a power belt from said vehicle.

References Cited in the file of this patent

UNITED STATES PATENTS

| | | |
|---|---|---|
| 181,715 | Perkins | Aug. 29, 1876 |
| 483,749 | Rogers | Oct. 4, 1892 |
| 965,933 | Pike et al. | Aug. 2, 1910 |
| 1,756,710 | Tuttle | Apr. 29, 1930 |
| 1,958,734 | Woodsmall | May 15, 1934 |
| 2,547,442 | Crafton et al. | Apr. 3, 1951 |